April 16, 1935. E. DODSON 1,998,362
CONTROLLING SUPERCHARGED OR OTHER HIGH COMPRESSION RATIO AIRCRAFT ENGINE
Filed July 6, 1934 6 Sheets-Sheet 2

April 16, 1935.　　　　E. DODSON　　　　1,998,362
CONTROLLING SUPERCHARGED OR OTHER HIGH COMPRESSION RATIO AIRCRAFT ENGINE
Filed July 6, 1934　　　6 Sheets-Sheet 3
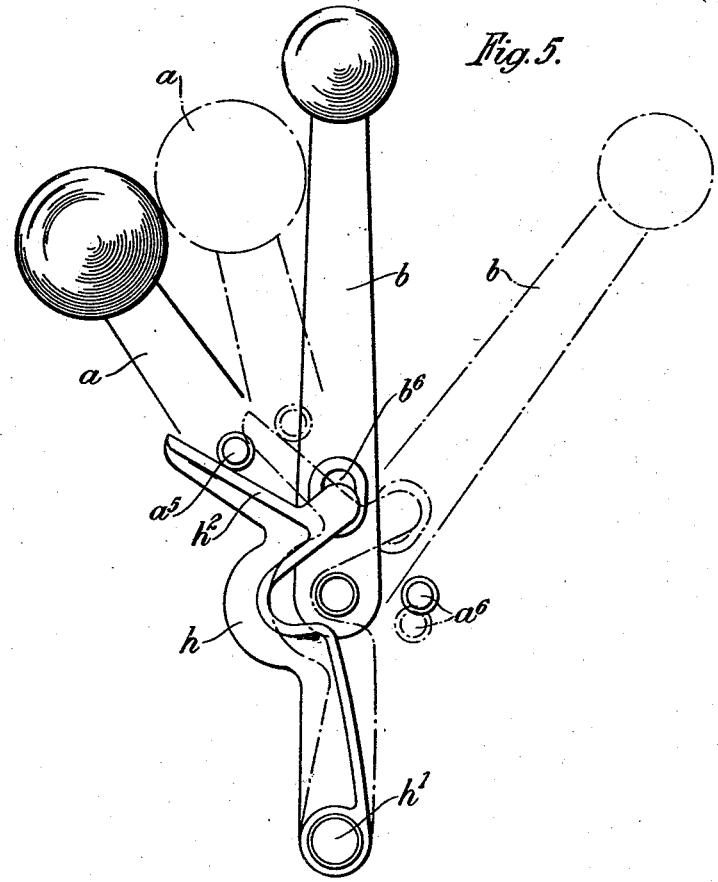
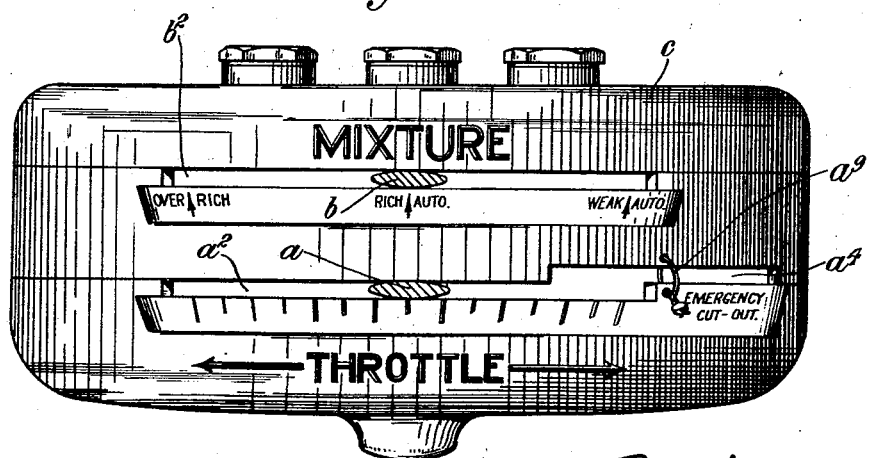

April 16, 1935.  E. DODSON  1,998,362
CONTROLLING SUPERCHARGED OR OTHER HIGH COMPRESSION RATIO AIRCRAFT ENGINE
Filed July 6, 1934  6 Sheets-Sheet 4

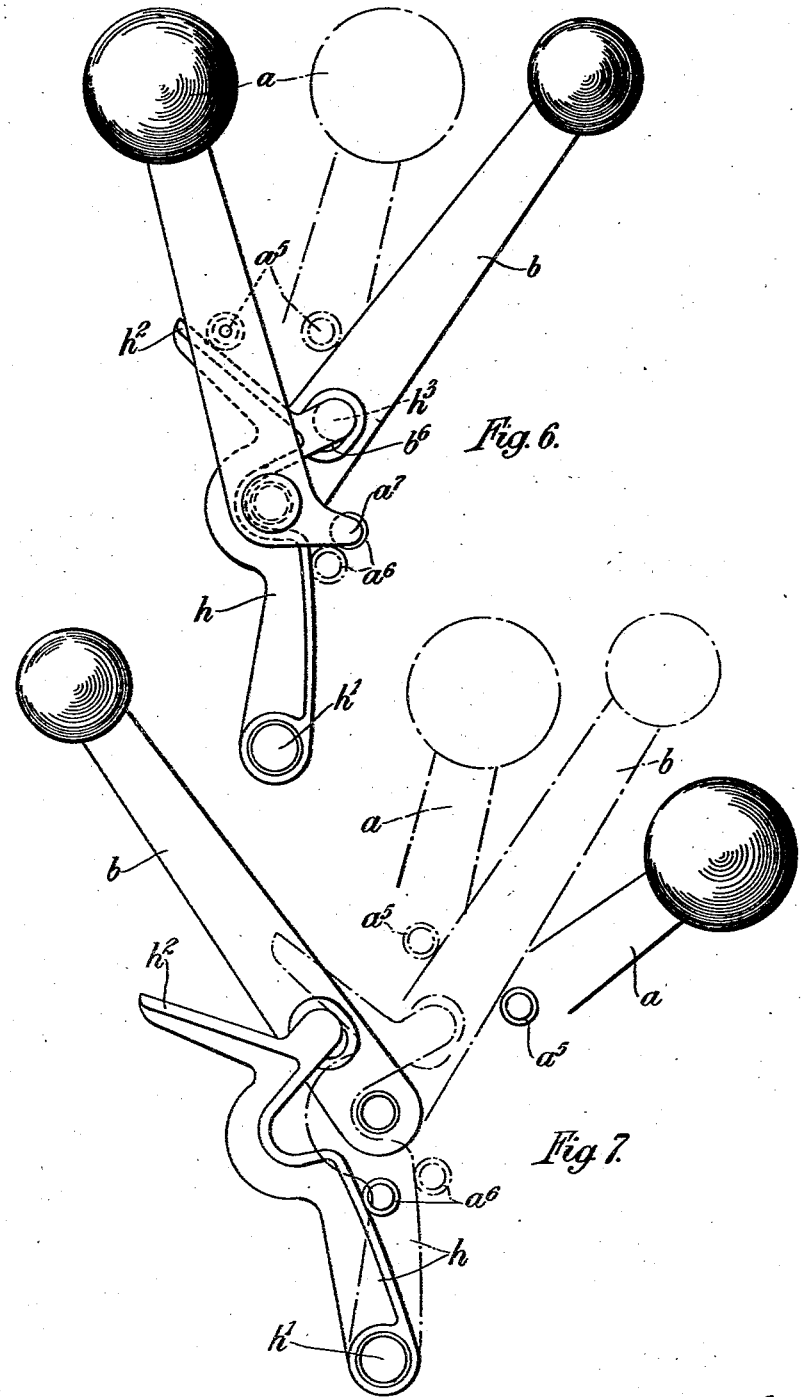

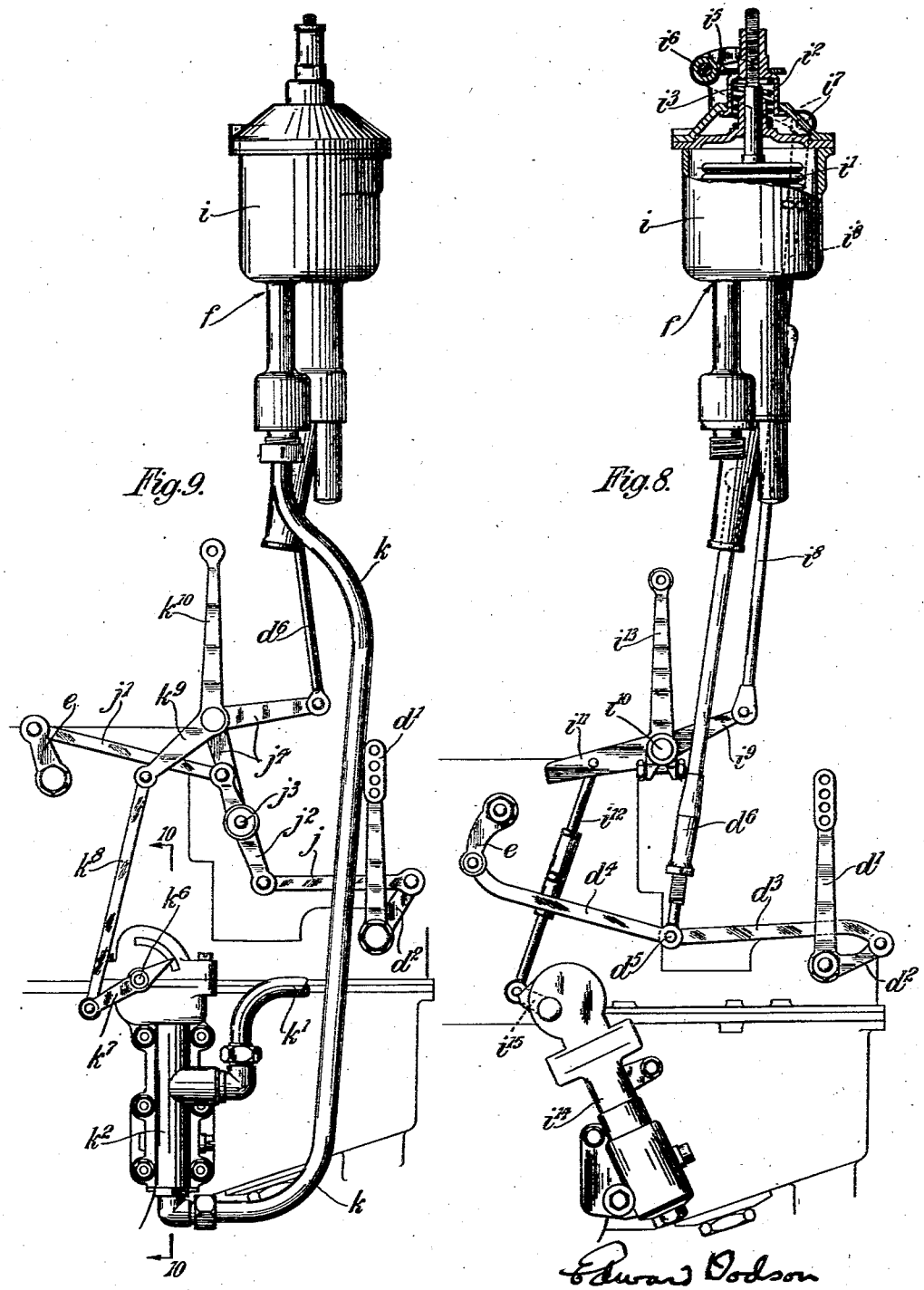

Patented Apr. 16, 1935

1,998,362

UNITED STATES PATENT OFFICE 1,998,362

CONTROLLING SUPERCHARGED OR OTHER HIGH COMPRESSION RATIO AIRCRAFT ENGINE

Edward Dodson, Streatham, London, England

Application July 6, 1934, Serial No. 734,066
In Great Britain August 22, 1933

18 Claims. (Cl. 123—99)

This invention relates to means for controlling supercharged, or other high compression ratio internal combustion aircraft engines (hereinafter termed supercharged aircraft engines).

In such engines, a device known as "a boost control" automatically prevents the pilot from opening the carburetter throttle valve more than is safe for a given altitude. With such a boost control it has been proposed to permit the boost control to be overridden in two ways, one in which the boost control is adapted to give increased power for take-off when a rich mixture is also supplied, but in such a manner that the boost control still remains automatic and controls the boost pressure to the predetermined figure up to the height at which the supercharger can maintain the pressure. This is known as "take-off boost override". The other override called the "emergency override" is arranged to take place when the pilot's throttle lever is pushed past its normal full throttle position into an emergency override position in which the boost control will be so overridden as to be unable to restrain the boost pressure from rising to an unsafe amount for reliability and which is only proposed to be used in a real emergency.

It has also been proposed to provide such engines with an automatic mixture control to correct the mixture (i. e. the proportion by weight of fuel to air) supplied by the carburetter, automatically for changes in altitude, and to provide means for altering the datum of the automatic mixture control so that it can be set to function automatically weak or automatically rich or be completely cut out of action. It has also been proposed, when using a non-automatic mixture control operated by the pilot, to provide an overrun position of the pilot's mixture control lever which operates the "take-off boost override" on a boost control and also causes the operation of means to enrich the mixture.

The object of the present invention is to provide control levers for the throttle valve and for the mixture correcting means which are so arranged as to prevent the pilot from obtaining a weak mixture when running at approximately normal full boost and further to ensure that additional enrichment occurs when normal boost is exceeded, either for the take-off or an emergency.

A further object is to ensure that opening of the throttle valve, after a dive with closed throttle, cannot be attempted with a weak mixture and to this end it is arranged for the pilot's throttle lever, when approaching the idling position, to bring the mixture control lever back to a rich automatic position.

According to this invention, the pilot's throttle lever is adapted to interengage with the mixture control lever through means which cooperates with said levers in such a way that when said pilot's throttle control lever is moved to its normal full throttle position and/or to its emergency override position, the mixture control lever is moved automatically to place it in the rich automatic position or to cut out the automatic mixture control of the carburetter and cause an ultra-rich mixture to be provided.

In case the mixture control lever is connected with a control for the automatic mixture control which enables either a weak automatically corrected mixture or a rich automatically corrected mixture to be supplied, the said levers and means will be so arranged that, when the pilot's throttle lever is moved to its full normal throttle position, the mixture control lever is automatically moved to its rich automatic position, and when the pilot's throttle control lever is further moved to its emergency override position, the mixture control lever will be automatically further moved to its over rich position for take-off boost, automatic mixture control cut out or an ultra-rich automatic mixture and the rich mixture arrangement on the carburetter for take-off boost will also be brought into action.

The arrangement is preferably such that a projection on the pilot's throttle control lever moves against a projection on the mixture control lever so that the mixture control lever is only moved by the projection on the throttle control lever if the mixture control lever has not previously been moved into the required position by the pilot.

The invention will now be described with reference to the example of construction shown in the accompanying drawings in which:—

Fig. 3 is a sectional plan view on the line 3—3 in Fig. 2.

Figs. 5, 6 and 7 illustrate diagrammatically the levers in three different positions, and illustrates the cooperation between the pilot's throttle control lever and the mixture control lever.

Fig. 8 illustrates the boost control with the mechanism for overriding the boost control and showing means for supplying additional fuel.

Fig. 9 is a similar view to Fig. 8 but illustrates a modified form of the means for overriding the boost control which is effected by air-leak instead of mechanically.

Fig. 10 is a sectional view on the line 10—10 in Fig. 9 of the valves controlling the boost control override and the rich mixture supply to the carburetter.

Fig. 11 is a section on the line 11—11 in Fig. 10.

Figure 1:
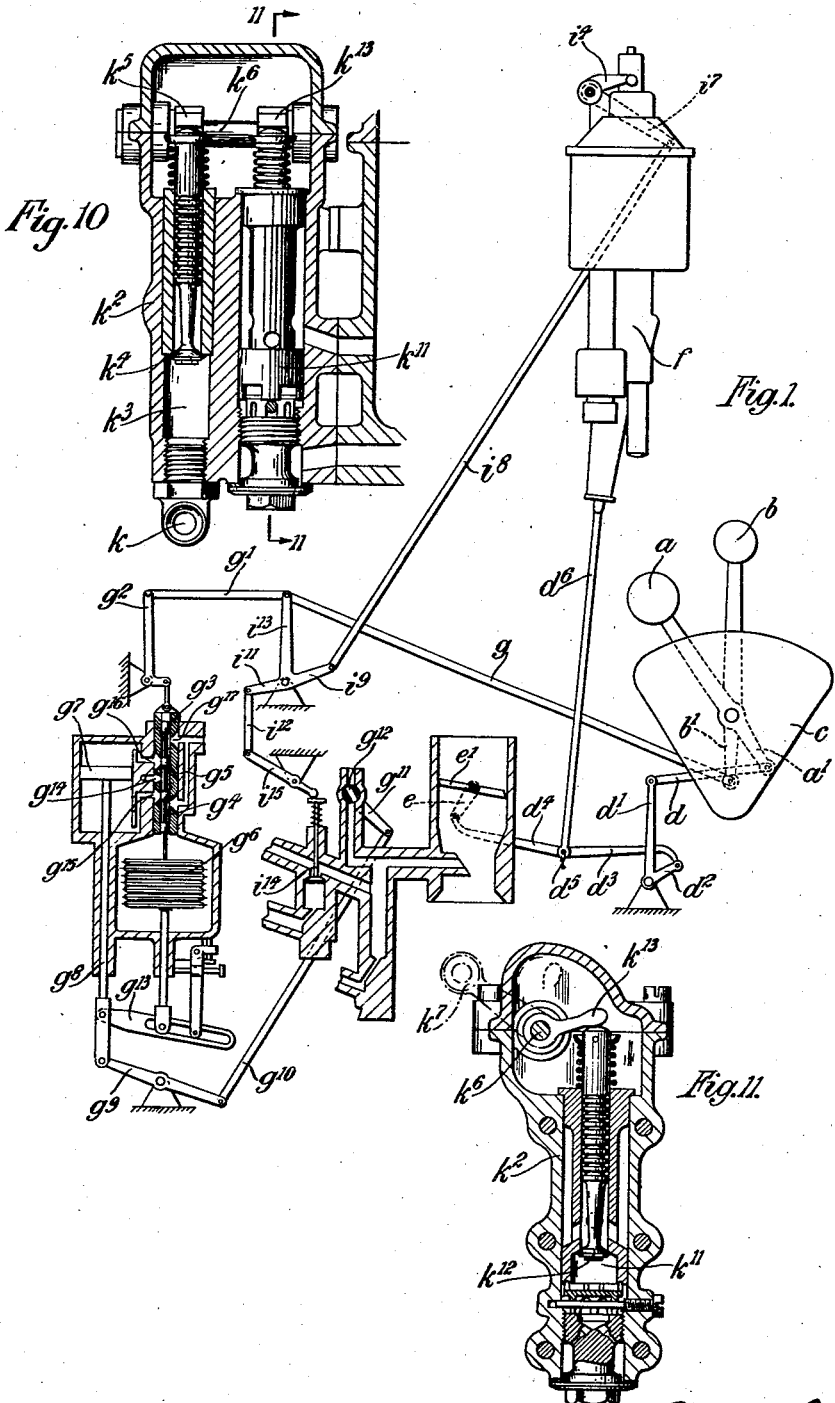
Fig. 1 illustrates diagrammatically the arrangement of the various controls and their interconnections with the pilot's throttle control lever and the mixture control lever.

As shown in Fig. 1 the pilot's throttle control lever $a$ and the pilot's mixture control lever $b$ are contained in a casing $c$ adapted to be mounted in the cockpit of the aeroplane. Exteriorly of the casing there are provided a throttle control arm $a^1$ and a mixture control arm $b^1$ fixed to the levers $a$ and $b$ respectively. The throttle control arm $a^1$ is connected in any convenient way, for instance by link $d$, to one arm $d^1$ of a bell crank lever, the other arm $d^2$ of which is connected to one link $d^3$ of a toggle linkage mechanism, the other link $d^4$ of which is connected to the arm $e$ of the carburetter butterfly throttle valve $e^1$. The toggle links $d^2$, $d^3$ are connected at their central pivot $d^5$ by a link $d^6$ to the boost control device $f$.

The mixture control arm $b^1$, on the other hand, is connected by any suitable means, for instance, links $g$, $g^1$, to the bell crank lever $g^2$ for operating a ported sleeve valve $g^3$ mounted to slide between a piston valve $g^4$ and the ported casing $g^5$ and constituting means for controlling the automatic mixture correcting device for the carburetter. This device acts to correct the mixture of fuel and air in accordance with changes in altitude by means of the aneroid $g^6$ connected to the piston valve $g^4$ which controls in a known way the supply and exhaust of pressure fluid to the servo-motor piston $g^7$, the piston rod $g^8$ of which is connected by the lever $g^9$ and rod $g^{10}$ to the arm $g^{11}$ of an air intake mixture control valve $g^{12}$ in the carburetter. The aneroid device is carried on a follow-up gear $g^{13}$ which is connected to the servo-motor piston rod $g^8$ and is operated by this to react on the aneroid device and the piston valve $g^4$ so as to cut off the pressure fluid from the servo-motor when the required adjustment has been effected.

Figure 2:
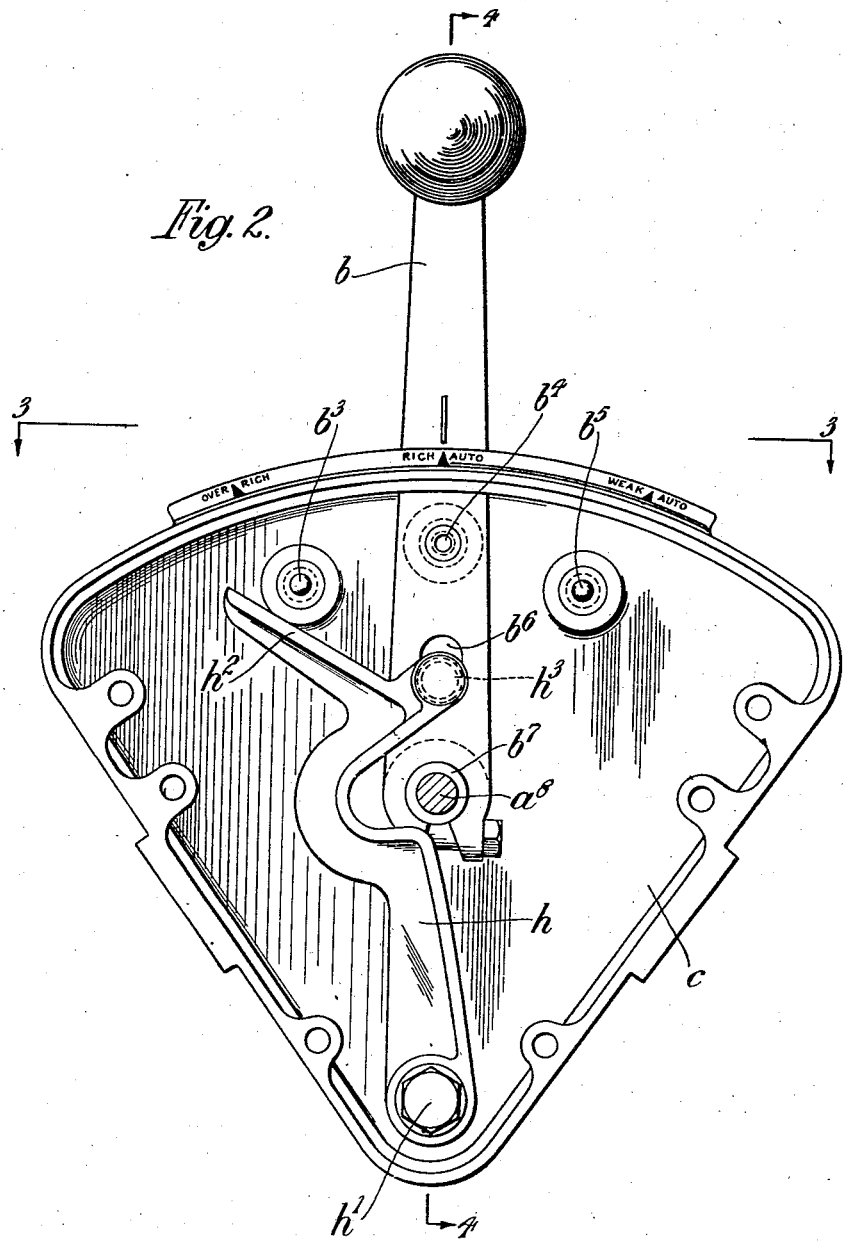
Fig. 2 is a sectional elevation through the casing containing the throttle control lever and the mixture control lever, and showing the mixture control lever and the actuating lever which is connected to this mixture control lever and is adapted to be actuated by the throttle control lever.
Figure 4:
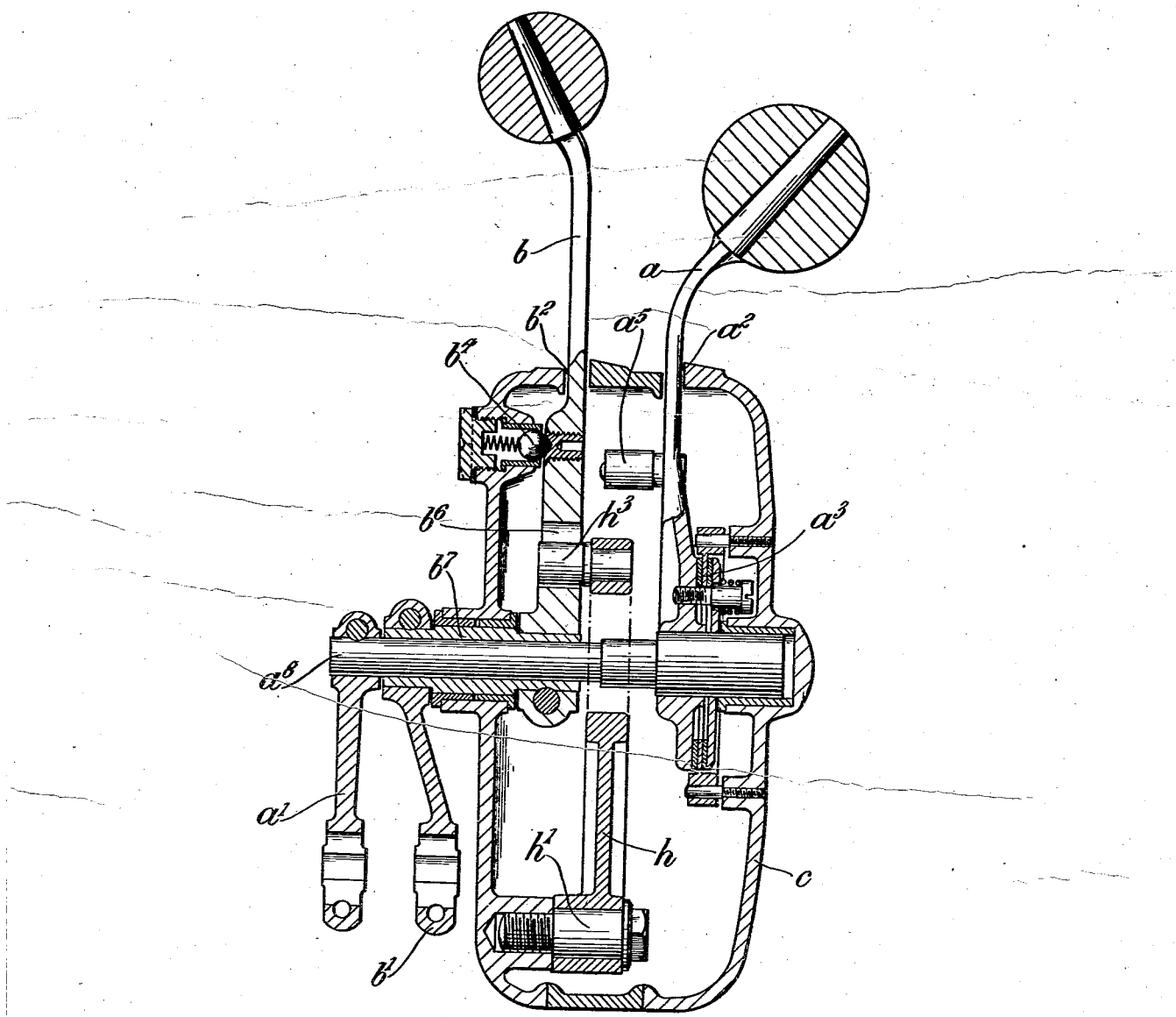
Fig. 4 is the cross section on the line 4—4 in Fig. 2, but showing the whole of the mechanism contained in the casing.

The pilot's throttle control lever $a$ and the mixture control lever $b$ are mounted to work in two slots $a^2$, $b^2$ Figs. 3 and 4, arranged parallel to each other. Three detents marked $b^3$, $b^4$ and $b^5$ Figs. 2 and 4, are adapted to be engaged by said mixture control lever $b$ and act to retain it in any one of three positions comprising the weak automatic position, the rich automatic position and the over rich mixture position. The mixture control lever $b$ when moved to any one of said positions moves the ported sleeve valve $g^3$ in relation to the inlet port $g^{14}$, the transfer ports $g^{15}$ and $g^{16}$ and the exhaust port $g^{17}$ provided for the admission and exhaust of the pressure fluid for actuating the servo-motor piston $g^7$. In the position of the pilot's mixture control lever shown in Figs. 1, 2 and 3, the arrangement is such that the pressure fluid has moved the piston $g^7$ to the position shown in Fig. 1 in which this partly closes the carburetter valve $g^{12}$ and so governs this valve that a rich automatic mixture will be supplied by the carburetter. If now the mixture control lever $b$ is moved to the right into its weak automatic position, the sleeve valve $g^3$ will be moved to communicate the inlet port $g^{14}$ to the transfer port $g^{15}$ and thus admit pressure fluid which acts to raise the piston $g^7$ and causes the valve $g^{12}$ to be opened more widely so giving a weak mixture which will be automatically regulated for altitude by the aneroid $i^1$ and the piston valve $g^4$. On the other hand, if the lever $b$ is moved to the left of the Fig. 1 position, the sleeve valve $g^3$ will be moved to admit pressure fluid from the inlet port $g^{14}$ through the transfer port $g^{16}$ and thus cause the piston $g^7$ to be moved partly down to the end of its stroke and still remain automatic but richer, or it can be arranged for the travel of the sleeve valve $g^3$ to be so great as to override completely the mixture control and prevent it being automatic, but in either case the mixture is enriched by operation of valve $i^{14}$.

The throttle control lever $a$ is provided with the device $a^3$ Fig. 4 for frictionally maintaining it in any adjusted position and is adapted to be moved against said device from a slow running position at the extreme left hand end shown in Figs. 1 and 5 through a central cruising position shown in Fig. 6 to a full normal throttle position. Beyond the full throttle position at the right hand end of the slot $a^2$ an extension $a^4$ of the slot is provided into which the throttle lever can be moved after breaking a seal $a^9$ placed across the end of said slot in a known way. When moved into said extension $a^4$, the throttle lever occupies the position shown in Fig. 7.

The pilot's mixture control lever $b$ is connected to an actuating lever $h$ (shown in Figs. 2, 3, 6 and 7) pivoted at $h^1$ to the casing $c$ and provided with an upward extension $h^2$ beyond the connection consisting of a pin $h^3$, engaging in the slot $b^6$. The pilot's throttle lever $a$ is provided with two projections $a^5$ and $a^6$, the latter being mounted on an extension $a^7$, Fig. 6, of the lever beyond its pivot. These projections (shown in Figs. 4, 5, 6 and 7) cooperate with the lever $h$ to cause the throttle lever $a$ to control the position of the mixture lever $b$. The throttle lever $a$ is fixed on a central shaft $a^8$ which passes through the casing $c$ and carries the arm $a^1$ while the mixture control lever $b$ is fixed on the sleeve $b^7$ surrounding the shaft $a^8$ and carrying the arm $b^1$ as shown in Fig. 4.

When the pilot's throttle lever $a$ is in the cruising position shown in Fig. 6, the pilot may have placed his mixture control lever $b$ in the weak automatic position as shown in Fig. 6 where the projections $a^5$, $a^6$ will not affect the lever $h$. If now, without moving the mixture control lever, the pilot moves the throttle lever $a$ from the cruising position shown in Fig. 6 and shown dotted in Fig. 5, to the slow running position shown in full lines in Fig. 5, then the projection $a^5$ will engage the extension $h^2$ on the lever $h$ and this lever will be moved to the left, causing the mixture control lever $b$ to be moved from its position shown in dotted lines into its central position as shown in full lines in Fig. 6. On the other hand, if the throttle lever is moved from the Fig. 6 position, shown in dotted lines in Fig. 7, into the extension $a^4$ of the slot $a^2$, breaking the seal, in which it will be in the position shown in full lines in Fig. 7, then the projection $a^6$ on the throttle lever $a$ will move against the lever $h$ and cause this to move the mixture control lever $b$ from the dotted position into the extreme left hand position as shown in full lines in Fig. 7. It will be understood that the position of the throttle control lever $a$ shown in dotted lines in Fig. 7 is not the full throttle position, but the latter is approximately midway between the dotted position and the full line position. Thus when the throttle control lever is moved to the full throttle position, the mixture control lever will be moved half way between its dotted and full line positions in Fig. 7 into its rich automatic position, by the projection $a^6$ and the lever $h$.

The mixture control lever is connected to the mechanism shown in Fig. 8 for overriding the boost control. To make this mechanism clear it is necessary to explain that the boost control consists of a casing $i$ communicating with the pressure side of the engine induction system and containing an aneroid $i^1$ which expands and contracts under variations of pressure, and thereby, preferably through a servo-motor (not shown), actuates the link $d^6$ in the well known manner. Fixed to the upper end of the aneroid $i^1$ is a cap $i^2$ which is pressed upwardly by a spring $i^3$ and which is adapted to be depressed against the spring by two fingers $i^4$, $i^5$. These fingers are fixed on a shaft $i^6$ actuated by an arm $i^7$ and link $i^8$ from an arm $i^9$ fixed upon a shaft $i^{10}$ which is turnable by an arm $i^{13}$ connected, as indicated diagrammatically by link $g$ in Fig. 1, to the mixture control lever. Reverting to Fig. 8, fixed upon the shaft $i^{10}$ is another arm $i^{11}$ which is connected by the link $i^{12}$ to the lever $i^{15}$ for operating a device $i^{14}$ controlling an enrichment jet adapted to supply additional fuel or to substitute or add an anti-detonant fluid. The arrangement is such that when the pilot's mixture control lever is moved into the position shown in Fig. 7, the mechanism $i^{13}$, $i^9$, $i^8$ and $i^7$ actuating the fingers $i^4$, $i^5$ is moved to cause these fingers to depress the aneroid $i^1$ and thus override the boost control. When overridden, the boost control will straighten the toggle levers $d^3$, $d^4$ and thus increase the opening of the throttle valve. Simultaneously, the mechanism $i^{13}$, $i^{11}$ and $i^{12}$ operating the device $i^{14}$ will open the enrichment jet and provide the necessary rich mixture.

In the construction of the boost control override shown in Figs. 9 to 11, the arrangement is again similar to the construction described with reference to Fig. 8, except that the throttle control is effected through two straight links $j$, $j^1$ and a floating lever $j^2$ instead of through the toggle links. In this case, the fulcrum $j^3$ of the floating lever is mounted on a bell crank lever $j^4$ which is operable by the link $d^6$ of the boost control $f$. In this construction also, instead of the mechanical means for overriding the boost control, this overriding is effected by means for varying the pressure supplied to the casing $i$ of the boost control. This means comprises the pipes $k$, $k^1$ adapted to communicate the casing to the induction pipe at a point of maximum depression. This pressure varying means is controlled by an air-leak valve forming part of a combined air-leak valve $k^4$ and enrichment jet contained in the casing $k^2$ and shown in detail in Figs. 10 and 11. The pipe $k$ communicates with the pipe $k^1$ through the cylindrical bore $k^3$ (see Fig. 10) under the control of the mushroom valve $k^4$. The valve $k^4$ is adapted to be actuated by a tappet $k^5$ on a shaft $k^6$ which extends through the casing $k^2$ and is connected by the arm $k^7$, link $k^8$ and arm $k^9$ to the arm $k^{10}$ which is operably connected with the pilot's mixture control lever in such a manner that when the mixture control lever is moved to its Fig. 7 position, the valve $k^4$ is opened to cause the pressure in the casing $i$ of the boost control device to be reduced. Thus the aneroid device $i^1$ expands and operates the floating lever and linkage mechanism to increase the opening of the throttle valve. The casing $k^2$ also contains a device $k^{11}$, controlling the flow of petrol to an enrichment jet, the control being effected by a mushroom valve $k^{12}$ (see Fig. 11) opened by a tappet $k^{13}$ on the shaft $k^6$ whenever the valve $k^4$ is opened. When open, the valve $k^{12}$ will admit extra petrol or an antidetonant fluid into the induction system so as to enrich the mixture or otherwise prevent detonation.

By operating the boost control override mechanism from the mixture control lever $b$, the advantage is obtained that the boost control is overridden and the enrichment jet is opened not only when the mixture control lever is moved into the over rich mixture position by the movement of the throttle control lever through the slot, but also when the mixture control lever itself is moved into the over rich mixture position for take-off.

It will be understood that the pilot's throttle control lever is adapted normally to be moved to the stop at the end of the slot $a^2$ where it is in its normal full throttle position. It will be seen, however, from Fig. 1 that owing to the shortening of the toggle linkage mechanism $d^3$, $d^4$ by the boost control that below the rated height, the carburetter throttle valve itself will not be at its full open position when the pilot's throttle lever is moved to said stop but will be restrained at a position which is less than the full opening depending upon the altitude. If, however, the pilot moves the throttle control lever $b$ into the extension $a^4$ he will then not only be able to move his lever further over to the right hand position and thereby increase the throttle valve opening, but this further movement will act, as previously explained, to move the mixture control lever to its over rich mixture position in which the boost control will be overridden, and this, in turn, will straighten the toggle links and thus fully open the throttle valve. Thus the pilot will be able to obtain full boost to cope with any emergency such as, for instance, an enemy aircraft attacking his machine from behind or meeting an unexpected obstacle when flying low over the ground.

It will be understood that although the means for actuating the mixture control lever from the pilot's throttle control lever are more conveniently arranged as illustrated in the accompanying drawings as an actual part of the pilot's cockpit control, said actuating means could be placed in any suitable position intermediate of the pilot's cockpit control and the parts of the engine which are to be operated by said control.

What I claim as my invention and desire to secure by Letters Patent is:—

1. Supercharged aircraft engines comprising a boost control, means for overriding said boost control, a pilot's throttle control lever, a carburetter, means for automatically correcting the proportion by weight of fuel to air supplied by said carburetter according to altitude, a mixture control lever, means operable by said mixture control lever for changing the datum of the automatic correcting means from a rich automatic mixture to a weak automatic mixture position and vice versa, and means operable by said throttle control lever for interengaging with said mixture control lever to prevent said throttle control lever from being moved to its normal full throttle position while the mixture control lever is in the weak mixture position.

2. Supercharged aircraft engines comprising a boost control, means for overriding said boost control, a pilot's throttle control lever adapted to be moved beyond its full throttle position to an emergency override position in order to operate said means for overriding the boost control, a carburetter, means for automatically correcting the proportion by weight of fuel to air supplied by said carburetter according to altitude, a mixture control lever, means operable by said mixture control lever for completely cutting out said automatic correcting means, and means operable by said throttle control lever for interengaging with said mixture control lever to prevent said throttle control lever from being moved to its emergency override position without the mixture control lever being moved to cut out said automatic correcting means.

3. Supercharged aircraft engines comprising a boost control, means for overriding said boost control, a pilot's throttle control lever adapted to be moved beyond its full throttle position to an emergency override position in order to operate said means for overriding said boost control, a carburetter, means for automatically correcting the proportion by weight of fuel to air supplied by said carburetter according to altitude, a mixture control lever, means operable by said mixture control lever for changing the datum of said automatic correcting means from a rich automatic position to a weak automatic position and vice versa and to cut out completely said automatic correcting means, and means operable by said throttle control lever for interengaging with said mixture control lever arranged to prevent said throttle control lever from being moved to its normal full throttle position without the mixture control lever being moved to change the datum of the automatic correcting means to the rich automatic position and also to prevent the throttle control lever being moved to its emergency override position without the mixture control lever being moved to cut out completely said automatic correcting means.

4. Supercharged aircraft engines comprising a boost control, means for overriding said boost control, a pilot's throttle control lever, a carburetter, means for automatically correcting the proportion by weight of fuel to air supplied by said carburetter according to altitude, means for controlling said automatic correcting means to vary the richness of the mixture supplied by the carburetter, and means operable by said throttle control lever for actuating said means for overriding the boost control and said means for controlling the automatic correcting means.

5. Supercharged aircraft engines comprising a boost control, means for overriding said boost control, a pilot's throttle control lever, a carburetter, means for automatically correcting the proportion by weight of fuel to air supplied by said carburetter according to altitude, means for controlling said automatic correcting means to vary the richness of the mixture supplied by the carburetter, a pilot's mixture control lever connected to said means for overriding the boost control and to said means for controlling the automatic correcting means, and means for operating said mixture control lever by said throttle control lever.

6. Supercharged aircraft engines, comprising a boost control, means for overriding said boost control, a pilot's throttle control lever, a slot for said control lever having an extension and having means for applying a seal across said extension, a carburetter, means for automatically correcting the proportion by weight of air to fuel supplied by the carburetter according to altitude, means for controlling said automatic correcting means to vary the richness of the mixture supplied by the carburetter, a pilot's mixture control lever, means connecting said mixture control lever to said means for controlling said correcting means and to said means for overriding the boost control, and means associated with said pilot's throttle lever and said mixture control lever to cause the mixture control lever to be moved to override both the boost control and the said correcting means when said throttle control lever is moved into said extension.

7. Supercharged aircraft engines, comprising a boost control, means for overriding said boost control, a pilot's throttle control lever, a slot for said control lever having an extension and having means for applying a seal across said extension, a throttle valve, means connecting said control lever to said boost control and throttle valve, a carburetter, means for automatically correcting the proportion by weight of air to fuel supplied by the carburetter according to altitude, means for controlling said automatic correcting means adapted to change its datum and also to cut it out completely, a pilot's mixture control lever, means connecting said mixture control lever to said means for controlling said automatic correcting means and to said means for overriding said boost control, and means for causing the throttle control lever when moved to its full throttle position to move the mixture control lever in order to change the datum of the automatic correcting means and when moved into said extension to move the mixture control lever to override the boost control and to cut out said correcting means.

8. Supercharged aircraft engines comprising a boost control, means for overriding said boost control, a pilot's throttle control lever, a slot for said control lever having an extension into which said control lever is adapted to be moved for overriding the boost control, a carburetter, means for correcting the proportion by weight of fuel to air supplied by said carburetter, according to altitude, a mixture control lever, means operable by said mixture control lever for controlling said correcting means in order to enable a weak automatic mixture, a rich automatic mixture and an over rich mixture to be obtained, means operable by said pilot's throttle control lever to ensure that the mixture control lever is moved to give a rich automatic mixture when the throttle control lever is moved to the full throttle position in the gate and that said mixture control lever is moved to give an over rich mixture when the throttle control lever is moved through the gate into said extension.

9. Supercharged aircraft engines, comprising a boost control, means for overriding said boost control, a pilot's throttle control lever, a carburetter, means for correcting the proportion by weight of air to fuel supplied by the carburetter according to altitude, means for controlling said correcting means, a pilot's mixture control lever, means connecting said mixture control lever to said means for controlling said correcting means and to said means for overriding the boost control, projections on said pilot's throttle lever, and an actuating lever for causing said mixture control lever to be actuated by said projections on the pilot's throttle lever.

10. Supercharged aircraft engines, comprising a boost control, means for overriding said boost control, a pilot's throttle control lever, a slot for said control lever having an extension and having means for applying a seal across said extension, a throttle valve, means connecting said control lever to said boost control and throttle valve, a carburetter, means for correcting the proportion by weight of air to fuel supplied by the carburetter according to altitude, means for controlling said correcting means a pilot's mixture control lever, means for connecting said mixture control lever to said correcting means and to said means for overriding said boost control, projections on said throttle control lever and an actuating lever operable by said projections for causing movement of said throttle control lever into said extension to move said mixture control lever so as to override said boost control and to operate said means for controlling the correcting means.

11. Supercharged aircraft engines comprising a boost control, means for overriding said boost control, a pilot's throttle control lever, a carburetter, means for correcting the proportion by weight of fuel to air supplied by said carburetter according to altitude, means for controlling said correcting means, an enrichment jet, means for opening said enrichment jet to cause the carburetter to supply a rich mixture, a pilot's mixture control lever connected to said means for overriding the boost control and to said means for controlling said correcting means and to said means for opening the enrichment jet, and means for operating said mixture control lever by said throttle control lever for simultaneously overriding the boost control and operating said means for controlling the correcting means and opening said enrichment jet to supply a rich mixture.

12. Supercharged aircraft engines, comprising a boost control, means for overriding said boost control, a pilot's throttle control lever, a carburetter, means for automatically correcting the proportion by weight of air to fuel supplied by the carburetter according to altitude, means for controlling said correcting means to enable a weak automatic mixture or a rich automatic mixture to be obtained, an enrichment jet, means for opening said enrichment jet to cause the carburetter to supply a rich mixture, a pilot's mixture control lever, means connecting said mixture control lever to said means for controlling said correcting means, to said means for overriding the boost control and to said means for opening said enrichment jet, projections on said pilot's throttle lever, and an actuating lever for causing said mixture control lever to be actuated by said projections on the pilot's throttle lever.

13. Supercharged aircraft engines, comprising a boost control, means for overriding said boost control, a pilot's throttle control lever, a slot for said control lever having an extension and having means for applying a seal across said extension, a throttle valve, means connecting said control lever to said boost control and throttle valve, a carburetter, means for correcting the proportion by weight of air to fuel supplied by the carburetter according to altitude, means for controlling said correcting means, a fuel enrichment jet, means for opening said enrichment jet, a pilot's mixture control lever, means connecting said mixture control lever to said means for overriding said boost control and to said means for opening said enrichment jet, projections on said throttle control lever and an actuating lever operable by said projections for causing movement of said throttle control lever into said extension to move said mixture control lever so as to override said boost control and to operate said control for said correcting means, and to open said enrichment jet.

14. Supercharged aircraft engines comprising a boost control including an aneroid, means for mechanically moving said aneroid in order to override said boost control, a pilot's throttle control lever, a carburetter, means for correcting the proportion by weight of fuel to air supplied by said carburetter according to altitude, means for controlling said correcting means to enable the mixture to be enriched, and means operable by said throttle control lever for actuating said means for mechanically moving the aneroid and said means for controlling said correcting means.

15. Supercharged aircraft engines comprising a boost control including an aneroid, means for mechanically moving said aneroid in order to override said boost control, a pilot's throttle control lever, a slot for said control lever having an extension and having means for applying a seal across said extension, a throttle valve, means for connecting said control lever to said boost control and to said throttle valve, a carburetter, means for correcting the proportion by weight of fuel to air supplied by said carburetter according to altitude, means for controlling said correcting means, a fuel enrichment jet, means for opening said enrichment jet, a pilot's mixture control lever, means connecting said mixture control lever to said means for mechanically moving said aneroid to override the boost control and to said means for controlling said correcting means and to said means for opening said enrichment jet, and means operable by said throttle control lever for moving said mixture control lever to override the boost control and to operate said means for controlling the correcting means and to open said enrichment jet.

16. Supercharged aircraft engines comprising a boost control, means for varying the pressure supplied to said boost control, means for opening said pressure varying means in order to override said boost control, a pilot's throttle control lever, a carburetter, means for correcting the proportion by weight of fuel to air supplied by said carburetter according to altitude, means for controlling said correcting means, an enrichment jet, means for opening said enrichment jet to cause the carburetter to supply a rich mixture, a pilot's mixture control lever connected to said means for opening said air-leak to override the boost control and to said means for controlling said correcting means and to said means for opening the enrichment jet, and means for operating said mixture control lever by said throttle control lever for operating said means for controlling the correcting means, for opening the air-leak for overriding the boost control and for opening said enrichment jet to supply a rich mixture.

17. Supercharged aircraft engines comprising a boost control including an aneroid, means for varying the pressure supplied to said boost control to override said boost control, means for controlling said pressure varying means, a pilot's throttle control lever, a slot for said control lever having an extension and having means for applying a seal across said extension, a throttle valve, means for connecting said control lever to said boost control and to said throttle valve, a carburetter, means for correcting the proportion by weight of fuel to air supplied by said carburetter according to altitude, means for controlling said correcting means, a fuel enrichment jet, means for opening said enrichment jet, a pilot's mixture control lever, means connecting said mixture control lever to said means for opening said air-leak device and to said means for controlling said correcting means and to said means for opening said enrichment jet, and means operable by said throttle control lever for moving said mixture control lever to operate said means for controlling the correcting means, and to open the air-leak device for overriding the boost control and to open said enrichment jet.

18. Supercharged aircraft engines comprising a boost control including an aneroid, means for varying the pressure supplied to said boost control to override said boost control, means for controlling said pressure varying means, a pilot's throttle control lever, a slot for said control lever having an extension and having means for applying a seal across said extension, a throttle valve, means for connecting said throttle control lever to said boost control and to said throttle valve, a carburetter, means for correcting the proportion by weight of fuel to air supplied by said carburetter according to altitude, means for controlling said correcting means, a fuel enrichment jet, means for opening said enrichment jet, a pilot's mixture control lever, means connecting said mixture control lever to said means for opening said air-leak device and to said means for controlling said correcting means and to said means for opening said enrichment jet, projections on said throttle control lever and an actuating lever operable by said projections on movement of said throttle control lever into said extension for moving said mixture control lever to operate said means for controlling the correcting means and to open the air-leak device for overriding the boost control and to open said enrichment jet.

EDWARD DODSON.